Oct. 27, 1925.
O. A. McELFISH
1,559,336
ANTISKIDDING DEVICE
Filed Feb. 16, 1925
2 Sheets-Sheet 1
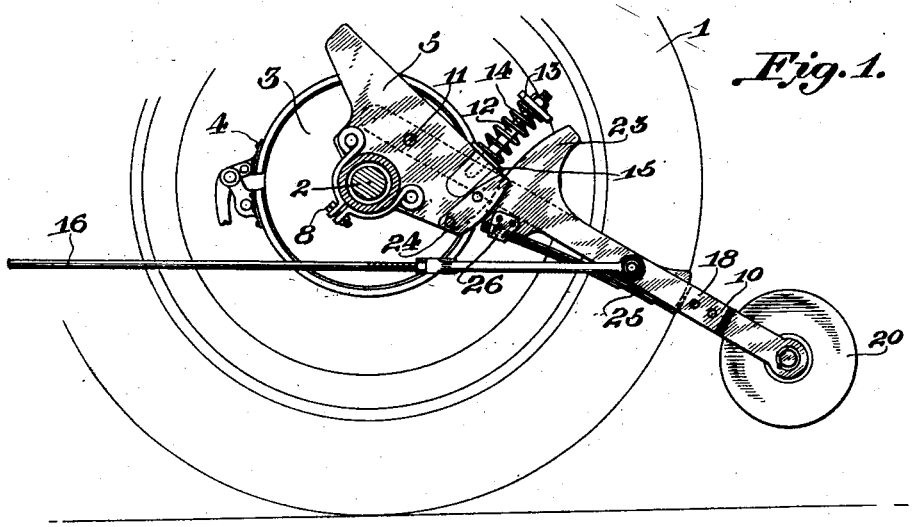
Fig. 1.
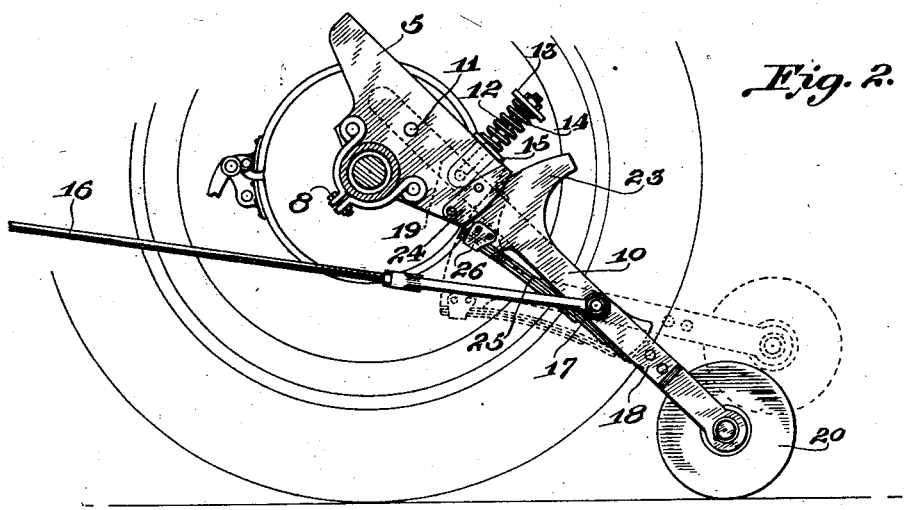
Fig. 2.
Fig. 6.
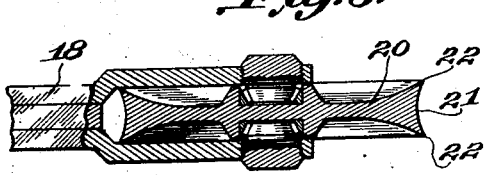
Inventor
O. A. McElfish.
By Eccleston & Eccleston
Attorneys

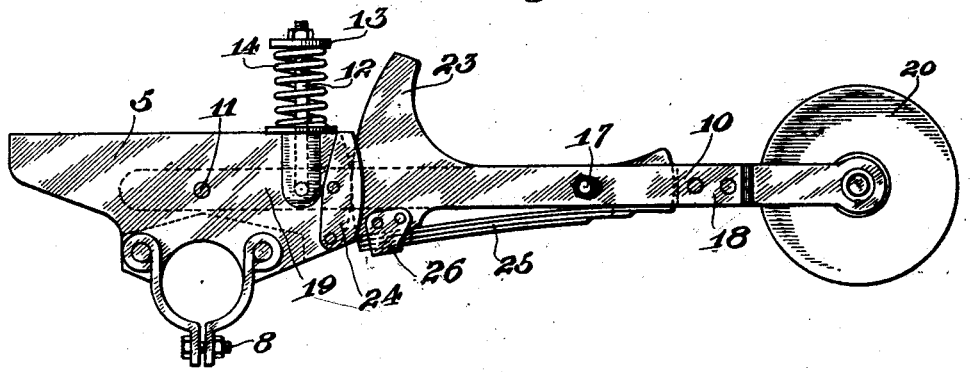
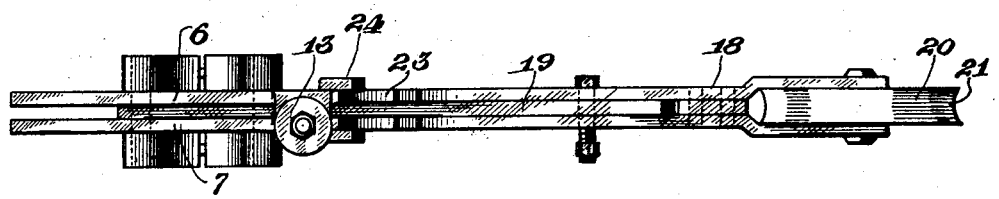
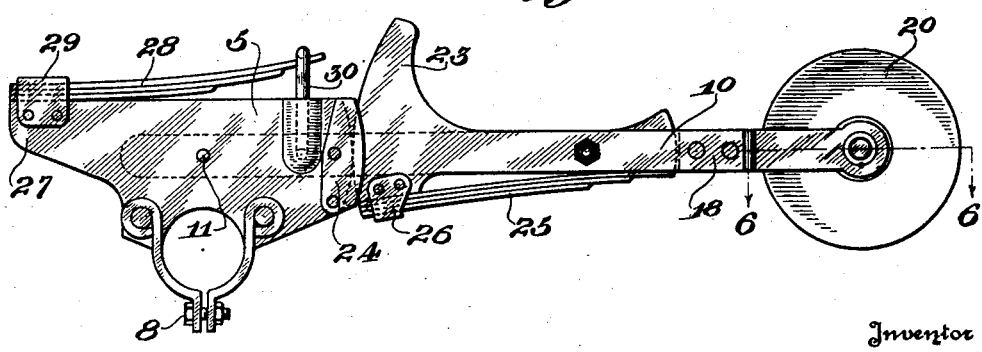

Patented Oct. 27, 1925.

1,559,336

UNITED STATES PATENT OFFICE.

OWEN A. McELFISH, OF CUMBERLAND, MARYLAND.

ANTISKIDDING DEVICE.

Application filed February 16, 1925. Serial No. 9,686.

*To all whom it may concern:*

Be it known that I, OWEN A. MCELFISH, a citizen of the United States, residing at Cumberland, in the county of Allegany and State of Maryland, have invented certain new and useful Improvements in Antiskidding Devices, of which the following is a full, clear, and exact description.

This invention relates to antiskidding devices for automobiles and similar vehicles and has for its object to provide a wheel adapted to be moved into contact with the surface over which the vehicle is traveling and thereby prevent lateral swaying or slipping of the vehicle.

Another object of the invention resides in so mounting the antiskidding device that it is normally disposed in an out of the way position, and in providing means for permitting the wheel and part of the supporting means to be pushed upwardly by a boulder or the like should the vehicle pass over such obstacles, thereby preventing damage to the parts.

Other objects and advantages of the invention will be apparent from the following description when taken in connection with the accompanying drawings, in which:

Figure 1 is a sectional view of the rear axle of an automobile and related parts and showing my antiskidding device in inoperative position thereon.

Figure 2 is a view similar to Figure 1 and showing the antiskidding device in use, and in dotted lines showing the same when engaged by an obstruction.

Figure 3 is a side elevation of the device detached from the automobile.

Figure 4 is a plan view of the mechanism as shown in Figure 3.

Figure 5 is a side elevation of a modified form of the invention to be used on either automobiles or trucks, and;

Figure 6 is a sectional detail view through the wheel.

Referring to the drawings more in detail the numeral 1 indicates the rear wheel of an automobile which is mounted on an axle 2 carrying the usual brake drum 3 and brake band 4.

In the present embodiment of the invention the apparatus which is employed to engage the ground to prevent skidding of the automobile is attached to the rear axle of the automobile by means of a clamp. Two or more of these antiskidding devices may be attached to the rear axle just inside of the brake drum but as they would be substantially identical in all respects only one of them need be shown and described. The clamp by which the antiskidding device is attached is indicated generally by numeral 5 and includes two parallel plates 6 and 7 between which the wheel-carrying arm is pivoted, and a clamping nut 8 by means of which the clamp is rigidly secured to the axle. As an additional means for fixedly securing the clamp to the axle a set screw may be employed if desired.

Pivoted upon the plates 6 and 7 of the clamp 5 is an arm 10, the pivot point being indicated by reference numeral 11. This arm is adapted to be moved upon its pivot so as to contact with the ground when in use, or to be raised above the ground when not in use. The means shown in Figures 1 to 4 inclusive for holding the arm 10 in retracted or inoperative position consists of a bolt 12 which is pivoted to the arm at one side of the pivot point 11 and which is provided with a head 13. A coil spring 14 surrounds the bolt 12 and engages under the head 13 at its upper end and upon a plate 15 at its lower end. The action of this spring is to swing the arm 10 upon its pivot 11 as indicated in Figure 1 to draw the same into inoperative position. When it is desired to swing the antiskidding device into engagement with the ground or surface upon which a vehicle is traveling the arm 10 may be pulled downwardly against the tension of spring 14 by means of a link 16 pivoted to the arm as indicated by numeral 17. This link may be attached to the hand or foot brake operating mechanism or to a separate lever having as its sole function the operation of the antiskidding device.

Obviously if the antiskidding device is in operative position as shown in Figure 2 or in inoperative position as shown in Figure 1, and the vehicle should pass over a large stone or boulder or any other enlargement which would strike the wheel of the antiskidding device some part of the apparatus must of necessity become bent or broken unless some means is provided for permitting the wheel to rise in the natural operation of the parts. Furthermore, when turning in the street such as by backing up against the curb or the like the apparatus might become damaged by the wheel hitting against the curb unless some means is provided as just referred to for permitting the wheel to rise in the natural operation of the parts. In this embodiment of the invention I have guarded against such a catastrophe by forming the arm 10 of two overlapping sections 18 and 19 pivoted at the point 17, this being the point at which the link 16 is connected to the arm 10. From an inspection of Figure 4 it will be seen that the section 18 is formed of two plates riveted together and have journaled therebetween at their free ends the wheel 20. This wheel has its periphery concaved as indicated by numeral 21 and as more clearly shown in Figure 6 so as to provide the sharp edges 22, 22 adapted to cut into the ice or the like when the apparatus is in use.

Obviously as the edges 22, 22 wear down through use the wheel may be put on a grinder and recut so as to bring its periphery back to the original contour.

The section 19 of the arm 10 consists of a single plate which as previously stated is pivoted between the plates of the clamp 5 at the point 11 and extends between the two plates of the section 18 and is pivoted between these plates at the point 17. The plates of section 18 are provided at their inner ends with segmental portions 23 which are adapted to oscillate between the guides 24 formed on the clamp 5 when the section 18 moves about its pivot point 17 due to vertical movements of wheel 20.

The two sections 18 and 19 of the arm 10 just previously described are normally kept in alignment by means of a leaf spring 25 secured to the segments 23 by means of a spring clip 26. This spring is of sufficient strength to hold the sections 18 and 19 in perfect alignment so long as the device is acting under normal conditions. If, however, the wheel 20 should strike a curb, boulder, or the like either when the arm 10 is elevated or lowered, the spring 25 will give sufficiently to permit the wheel to be raised by the obstruction as is clearly indicated in Figure 2, thereby preventing damage to the parts which might otherwise occur.

For heavier vehicles such as trucks and the like which might require a stronger antiskidding device, the coil spring 14 might be too weak for its purpose and accordingly in Figure 5 of the drawings I have disclosed a modified form of construction in which a leaf spring may be employed. In this form of the invention the extension 27 of the clamp provides a foundation for the leaf spring 28. This spring is attached to the extension 27 by means of a spring clip 29 and has its free end engaged under a link 30 which is pivoted to the arm 10 in the same manner as the bolt 12 previously described in connection with the preferred form of the invention. This latter form of spring can, of course, be made of any strength desired, and is also preferable to the coil spring in that it does not extend to such a great height above the top of the clamp.

From the foregoing description taken in connection with the accompanying drawings it will be observed that I have devised an exceedingly simple construction of antiskidding device which may be readily applied to any type of automobile now in use; that it is automatically movable to inoperative position and that efficient means are provided for avoiding damage to the parts when operating under unusual circumstances.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. In a device of the class described a clamp adapted to be secured to an axle, an arm pivoted to said clamp and composed of two hinged sections, a spring for normally holding said sections in alignment, cooperative guiding means on said clamp and one of said sections, and a wheel journaled on the free end of said arm.

2. In a device of the class described a clamp adapted to be secured to an axle, an arm pivoted to said clamp and composed of two hinged sections, a leaf spring normally holding said sections in alignment, means for normally holding said arm in inoperative position, and means attached to the hinge of said sections for drawing the arm to operative position.

3. In a device of the class described an arm composed of two hinged sections, means pivotally connecting said arm to the axle of an automobile, a leaf spring connected to one section of the arm and adapted to normally hold said sections in alignment, a guide formed on said means for pivotally connecting the arm, and a sector shaped element on one of said sections for cooperation with said guide.

OWEN A. McELFISH.